United States Patent [19]

Kauffman

[11] 4,077,662
[45] Mar. 7, 1978

[54] EXPANSIBLE CAMPER

[76] Inventor: Clarence B. Kauffman, R.D. No. 1, Atglen, Pa. 19310

[21] Appl. No.: 564,110

[22] Filed: Apr. 1, 1975

[51] Int. Cl.² .............................................. B60P 3/32
[52] U.S. Cl. ................................. 296/23 G; 135/4 A
[58] Field of Search ................ 296/23 R, 23 A, 23 E, 296/23 F, 23 G, 26, 137 R; 135/1 A, 3 A, 4 A, 5 A; 49/379

[56] References Cited

U.S. PATENT DOCUMENTS

| | | | |
|---|---|---|---|
| 1,431,187 | 10/1922 | Sherwood | 296/23 A |
| 1,477,111 | 12/1923 | Eaton | 296/23 R |
| 3,111,955 | 11/1963 | Green | 296/23 R X |
| 3,163,460 | 12/1964 | Cox | 296/23 E |
| 3,325,206 | 6/1967 | Carlson | 135/1 A |
| 3,445,134 | 5/1969 | Pair et al. | 135/1 A X |
| 3,454,020 | 7/1969 | Grossman | 135/1 A |
| 3,598,441 | 8/1971 | Damiani | 296/23 R |
| 3,619,001 | 11/1971 | Borskey | 296/137 B |
| 3,675,885 | 7/1972 | Shute | 296/23 R X |
| 3,712,316 | 1/1973 | Leonard | 135/1 A |
| 3,724,893 | 4/1973 | Giroux | 296/23 R |
| 3,823,975 | 7/1974 | Cooper | 296/23 R |
| 3,845,775 | 11/1974 | Norris et al. | 135/1 A |
| 3,896,595 | 7/1975 | Anghinetti | 49/379 |

Primary Examiner—Robert J. Spar
Assistant Examiner—Donald W. Underwood
Attorney, Agent, or Firm—Mason, Mason & Albright

[57] ABSTRACT

A camper vehicle wherein substantially the entire roof and interior ceiling panel are both pivotable each about opposite longer sides of the vehicle's body. The roof pivots an arcuate movement of about 75° and the ceiling panel of about 180°. Articulated struts pivotably connected on one end to the roof and on the other proximate the hinge for the ceiling panel secure the roof in its open position, the struts being locked in their extended positions by a slideable member. Although straps from the upper longer side of the roof to the opened ceiling panel support the ceiling panel in its open position, outside poles may be utilized to assist in providing such support. A tent is provided between opposite ends of the ceiling panel and roof and a rod is provided spaced above the outer end of the ceiling panel which is pivoted by further connecting rods about an axis proximate the pivotable axis of the ceiling panel, the rod raising the tent relative to the ceiling panel and the connecting rods being extensible. A torsion spring member may be provided partially to counterbalance the weight of the roof. The tent and supporting straps are carried between the roof and ceiling panel when the latter are in closed positions.

20 Claims, 13 Drawing Figures

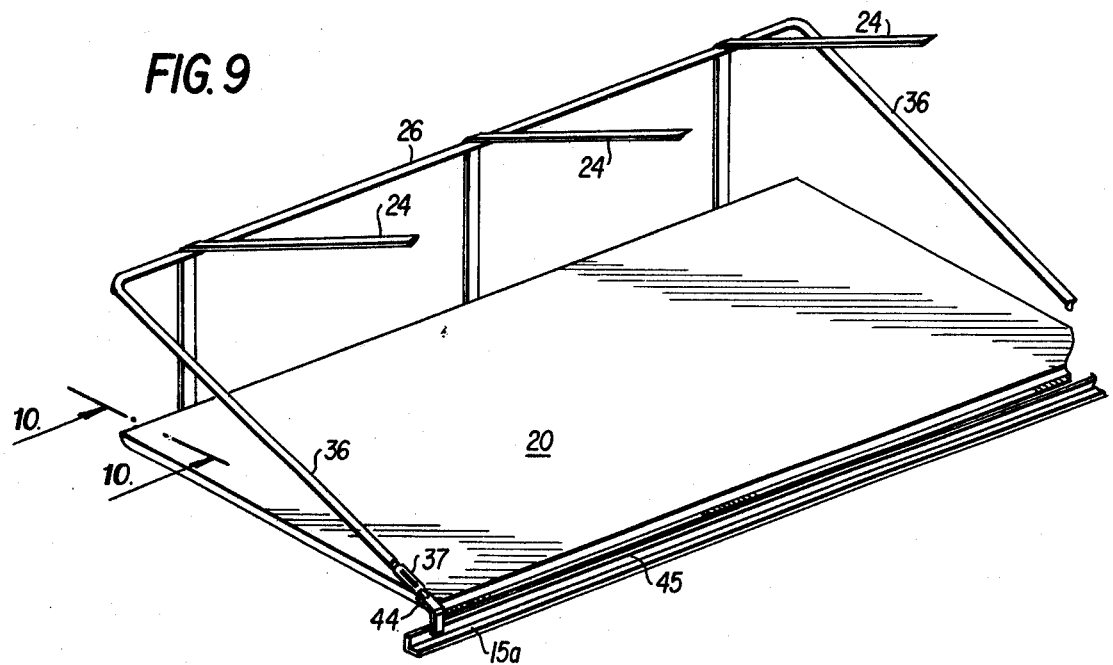
FIG. 9
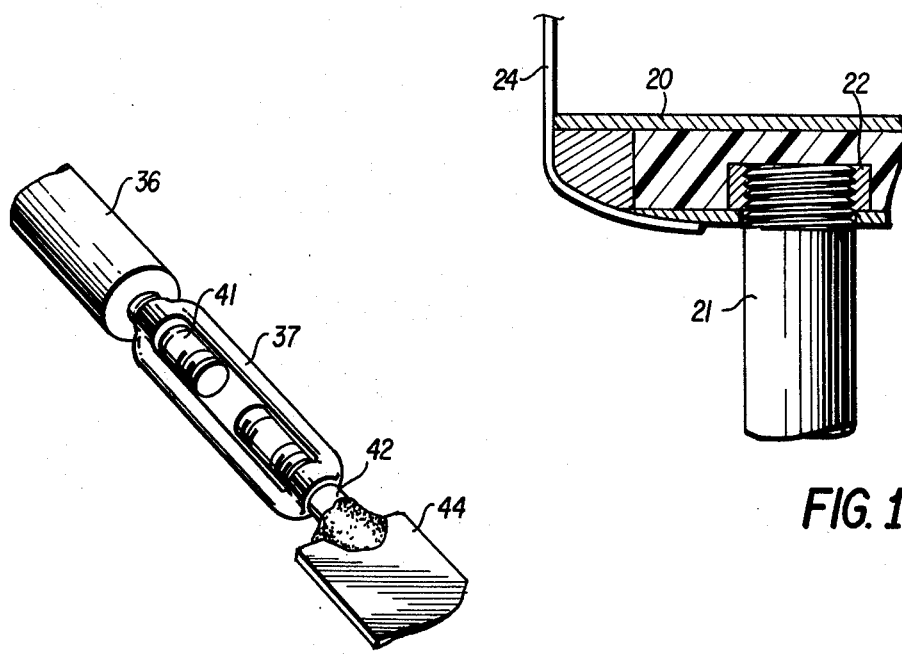
FIG. 10
FIG. 11

4,077,662

EXPANSIBLE CAMPER

BACKGROUND OF THE INVENTION

The invention relates to an expansible camper for incorporation in vehicles such as vans and panel trucks. More particularly it relates to a camper which makes use of both the roof of the vehicle and an interior ceiling panel whereby they are pivoted about separate opposed parallel axes on either side of the vehicle to provide means for mounting a covering or tent member with a resulting substantial expansion of available space for camping purposes as compared to that provided within the vehicle per se.

The use of campers combined with vans, panel trucks, and even station wagons has been increasing in popularity. Such vehicles are favored inasmuch as they can function as a first or second automobile by the owner and at the same time be used during vacations and weekends to provide comfortable camping facilities. A major problem of such campers is that it is difficult to arrange in the limited space provided adequate camping facilities without substantially disfiguring the vehicle or requiring a special attachment or accessory member or both. Various attempts have been made to meet this problem and although these have met with greater or lesser success, a need continues to exist which has existed for some time for a camper vehicle which appears and functions essentially as an ordinary vehicle and yet provides for substantial expansion of its available space when utilized for camping purposes. For examples of the current state of the art, particular attention is invited to U.S. Pat. Nos. 3,400,968, 3,411,819, 3,454,020, 3,475,048, 3,659,893, 3,712,316, 3,713,687, 3,746,386 and 3,802,732.

A further camper unit of interest having certain similarities to the invention disclosed herein is the Romany Dormobile Camper picture and described in *Popular Science*, Sept., 1971, page 40.

SUMMARY OF THE INVENTION

The instant invention makes use of the roof of the camper vehicle, its underlying ceiling panel and space between them to provide for the expansion of the vehicle's space by pivoting both the roof and the ceiling panel about different axes along opposite sides of the camper. The roof is preferably raised in an arc of movement of between 45° and 90° and more usually about 75° whereas the roof panel is pivoted about 180° to provide a roof level deck approximately the area of the floor of the vehicle, if desired. The roof is held in its upright position by articulated struts and the ceiling panel is maintained in its open position by straps connected to the top of the open roof. A cover or tent also extends between the top edge of the open roof and the outward edge of the ceiling panel and provides in part support for the ceiling panel in its open position. A rod member, which is pivoted from a location near to where the ceiling panel is hinged, may be spaced above the end of the ceiling panel to provide additional interior volume with the tent and supporting straps being connected to such rod as well as the ceiling panel and the upper edge of the roof. The enclosure of the tent member which extends from the outer portion of the ceiling panel to the upper portion of the roof is thus substantially expanded.

The tent is carried together with the straps (which may be connected to the tent material) between the roof and ceiling panel when they are in their closed position. The rod for expanding the tent and the articulated strut for securing the roof may be carried above that portion of the ceiling member which surrounds the ceiling panel. When the roof and roof panel are in closed position, the vehicle is practically indistinguishable from a comparable vehicle not so modified. Nevertheless, the camping unit is capable of rapid expansion for camping purposes and securing for travel without difficulty and in a relatively short period — a matter of a few minutes.

The camper unit in accordance with the instant invention is reasonably inexpensive and, in addition to its other advantages, permits the user to orient the vehicle either to maximize the cooling within the combined space provided by the vehicle and camping unit by positioning the vehicle so that the prevailing wind is parallel to the longitudinal axis of the camper or to minimize heat loss by placing the camper in a position whereby the open roof acts as a shelter from the prevailing wind for the tent member.

The foregoing summary of the invention refers to important objects, adaptabilities and capabilities of the invention. However, other significant aspects of the invention will be appreciated by those skilled in the art as the description progresses, references being had to the accompanying drawings, in which:

BRIEF DESCRIPTION OF THE DRAWINGS

FIG. 9 is perspective detail view of the ceiling panel and tent rod in their open positions;

FIG. 10 is a broken sectional view taken on lines 10 — 10 in FIG. 9;

FIG. 11 is detail view showing the adjustable extension member for the supporting rods of the tent rod.

DESCRIPTION OF THE PREFERRED EMBODIMENT

Figure 1:
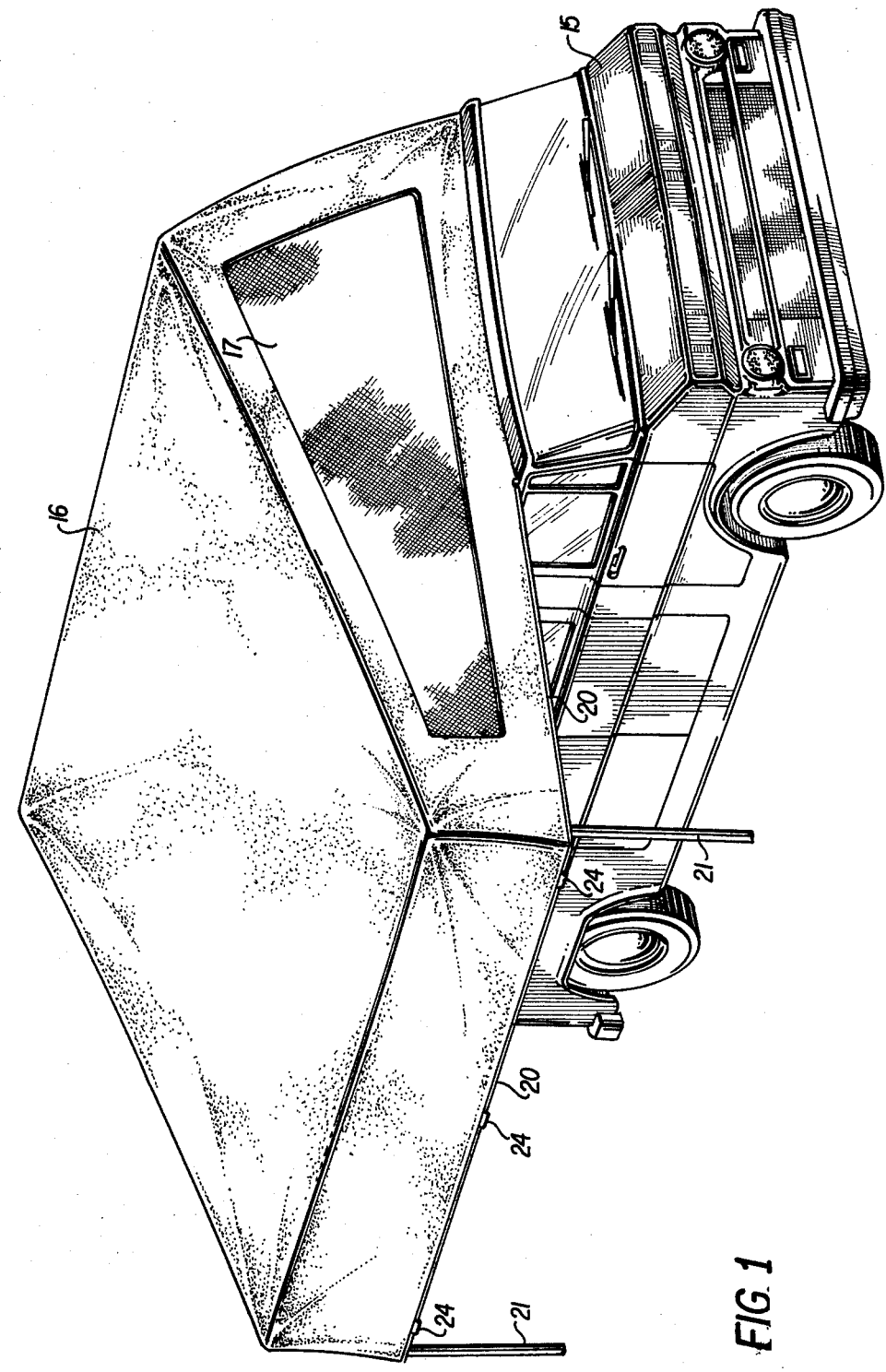
FIG. 1 is a perspective view of a camper vehicle in accordance with the invention with the camper portion opened.
Figure 2:
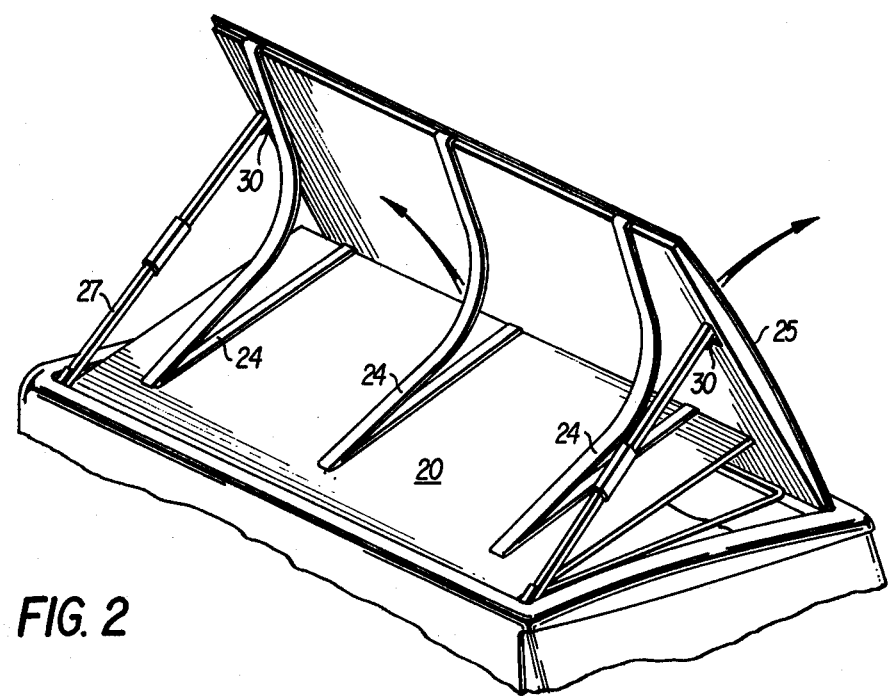
FIG. 2 illustrates in a perspective broken view of the top of the vehicle as shown in FIG. 1 with the camper unit being opened.

To understand the construction of the camper vehicle of the invention, process of making it and its use reference is first made to FIG. 1. Here it is seen that the van type body 15 of the camper vehicle has a covering member comprising a tent 16 which may include either forward or aft or both a screen 17 for ventilation and light. The ceiling panel 20 has been pivoted 180° and is in its open position. A pair of poles 21 have been provided for the purposes of supporting the ceiling panel although, as will be later explained, they do not in fact provide the major support for the ceiling panel and are actually optional, serving more for reassurance of those who may be asleep or otherwise be supported on the deck which the open ceiling panel provides in the camper than for supporting purposes. As seen in FIG. 10, these poles have their upper ends each received by a recessed ring 22 may be, if desired, a threadable connection. Although not shown, the poles may be adjustably extensible to various lengths to allow for variations in the level of the underlying ground.

Figure 3:
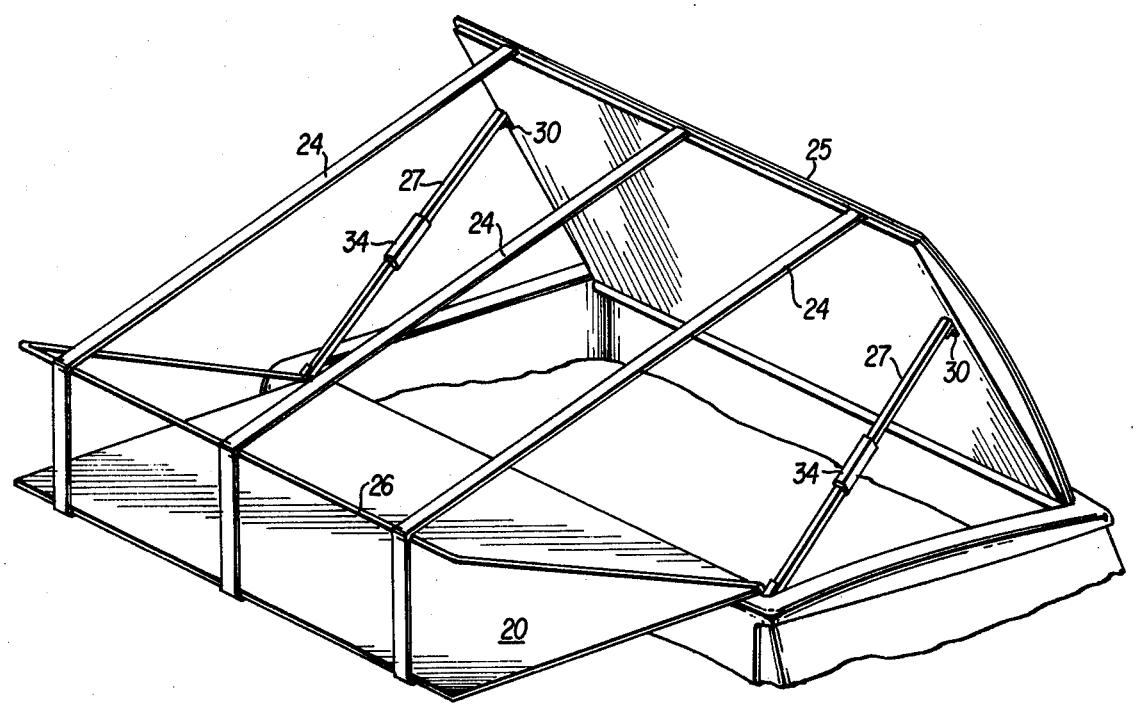
FIG. 3 is a further broken view similar to FIG. 2 with the ceiling panel and tent supporting rod in their opened position.
Figure 6:
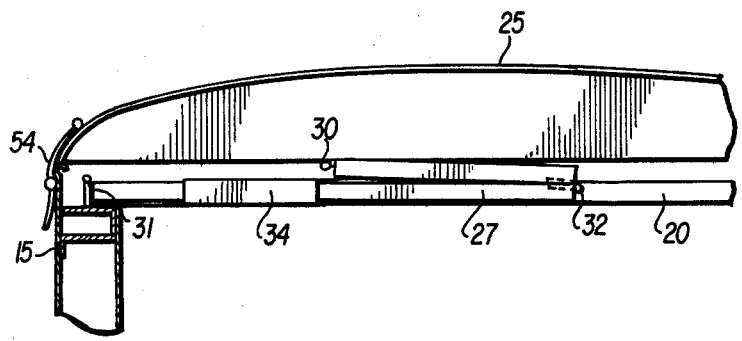
FIGS. 6, 7 and 8 are broken detail views showing movements of the articulated strut which holds the roof in its upright open position.
Figure 7:
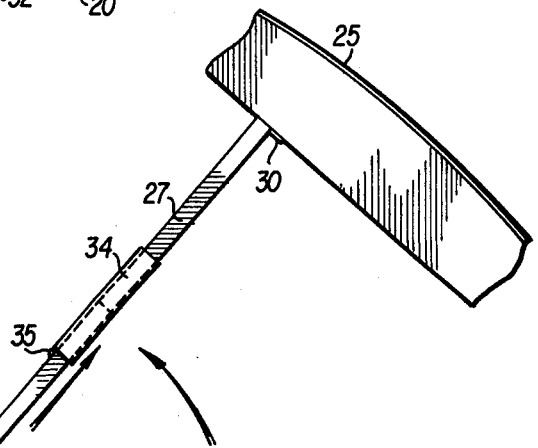
Figure 8:
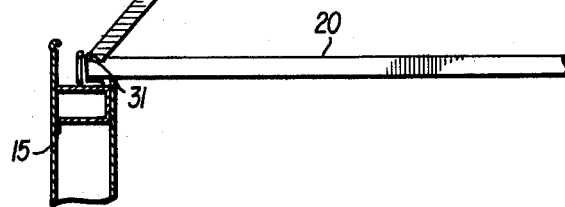
Figure 8:
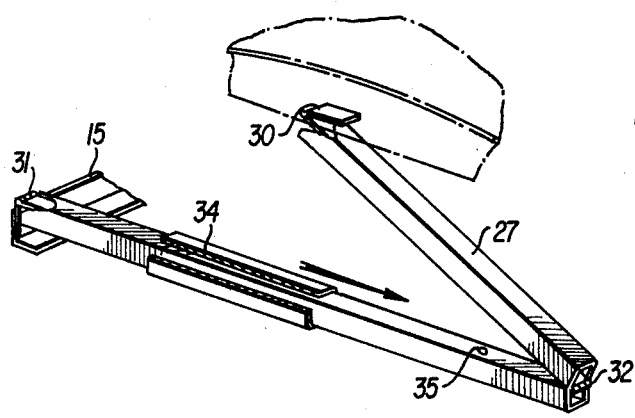
Figure 12:
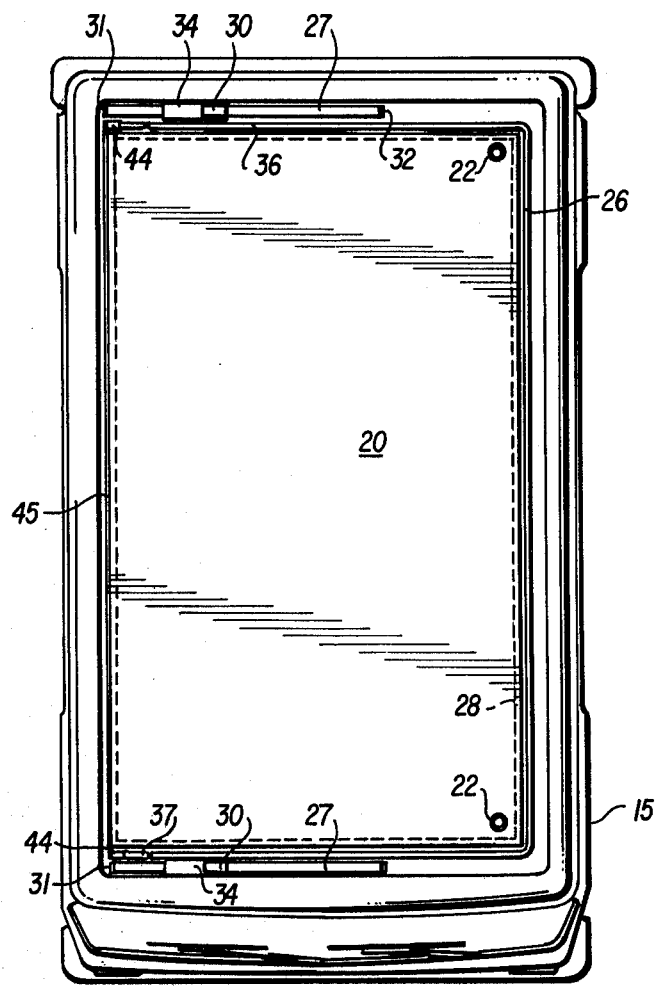
FIG. 12 is a plan view of the camper vehicle of the invention with the roof removed.

The primary means for supporting the ceiling panel 20 constitutes two or more straps 24, only the ends of which are visible in FIG. 1. As shown in FIG. 3, the straps are firmly connected to the top edge of the roof 25 and extend first to a tent rod 26 to which they are also connected and finally to the outer edge of the ceiling panel where they are finally secured. FIG. 3 also illustrates a pair of articulated struts 27 which are pivotably connected to the roof by a hinge member 30 and, as best shown in FIGS. 6, 7 and 8, on its opposite end each strut is connected by a hinge member 31 to one side of the camper vehicle's body. Each strut 27 includes an articulated joint 32 and a tubular slideable member 34 which is movable from the position shown in FIGS. 6 and 8 to that shown in FIG. 7 where it retains the strut in its extended position and rigidly secures the roof in its opened position. Also as shown in FIGS. 7 and 8, a dedent member 35 in each strut is resiliently urged upwardly to serve as insurance that slideable member 34 is not accidentally dislodged downwardly from the position shown in FIG. 7 whereby the roof might accidentally collapse. Each strut is provided on either side of a shorter side of the ceiling panel as illustrated in FIG. 12. For this reason to accommodate the struts, the length of the ceiling panel is made a few inches shorter than the roof. Also accommodated in the spaces at each end of the ceiling panel when closed are the supporting members for tent rod 26 which comprise rods 36 as seen in FIG. 9. The opening in the ceiling of vehicle 15 for the ceiling panel may be the same dimensions as the ceiling panel or less as indicated by dotted lines 28 in FIG. 12.

In actual practice rods 26 and 36 may be integral or separate, but in either event it is preferred that rods 36 be extensible and this is accomplished by an adjustable extension comprising a turnbuckle 37 which receives a threaded stud 41 extending rigidly from rod 36 and a further stud 42 extending rigidly from a hinged member 44 which is connected from its other end to a bar 15a that, in turn, is rigidly connected to the body 15. The studs are oppositely threaded so that by turning the turnbuckle, the effective length of rod 36 is extended or shortened as desired. This is used to make the tent taut and, additionally, may be utilized for levelling the ceiling panel within limits.

Figure 4:
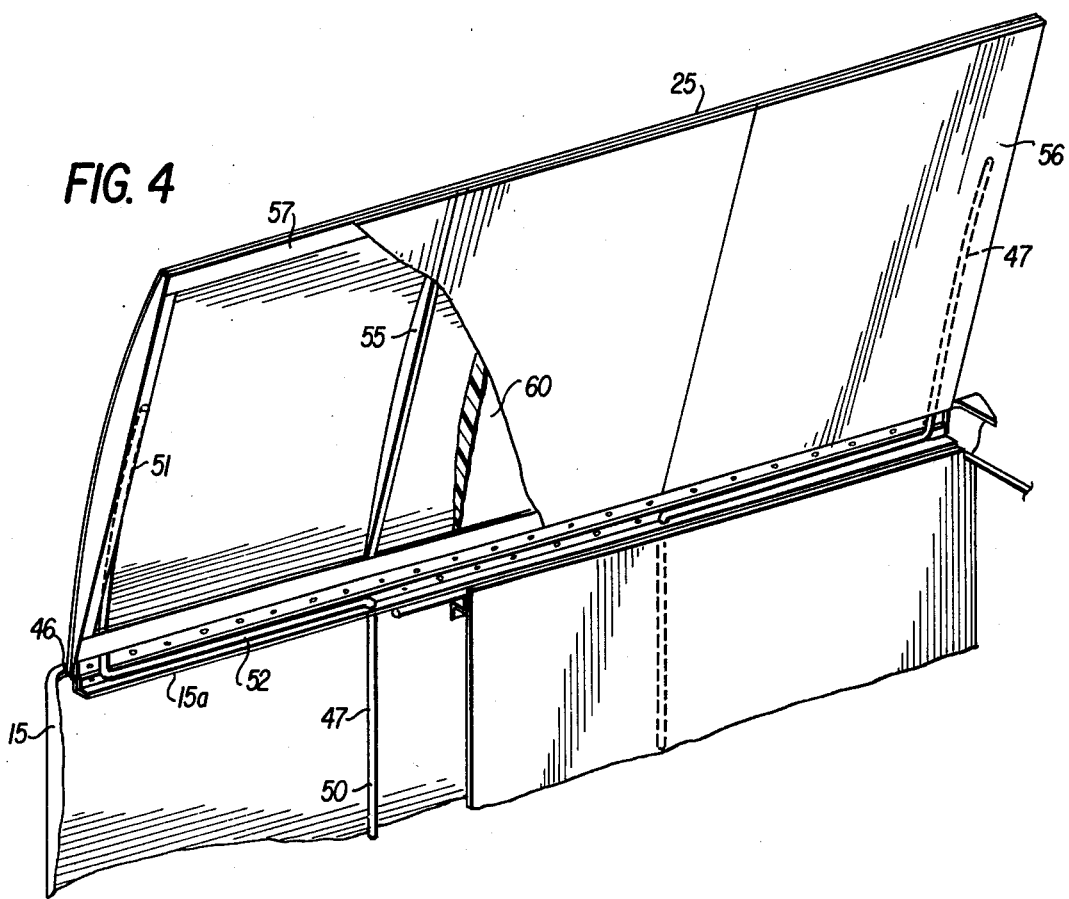
FIG. 4 is a further broken perspective showing the torsion bar for the roof which is in its open position.
Figure 5:
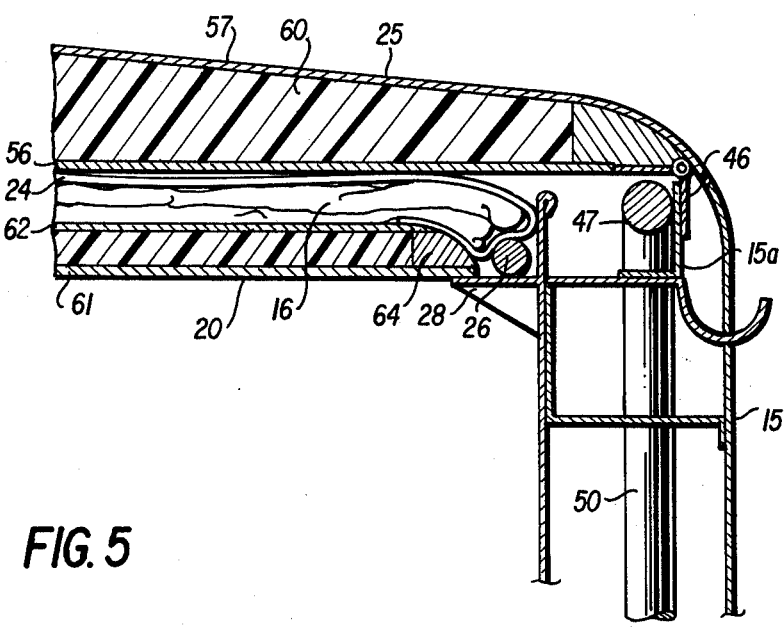
FIG. 5 is a broken sectional view of the roof and ceiling panel in their closed positions.
Figure 13:
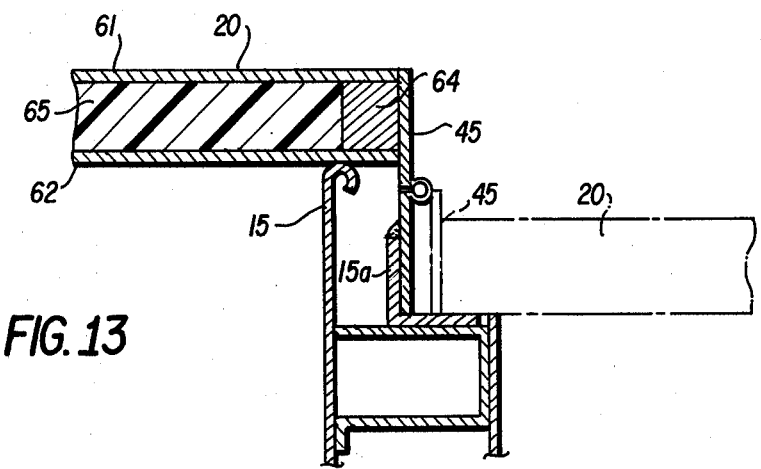
FIG. 13 is a side elevational detail in section showing the hinge connection of the ceiling panel.

In FIGS. 9 and 13, it is to be seen that the ceiling panel is connected to bar 15a by means of an elongated hinge 45. A similarly elongated hinge 46 (FIGS. 4 and 5) is provided for the roof.

To urge the roof in its open position, a pair of torsion bars 47 are provided; each torsion bar 47 composed of a highly resilient metal has its lower leg 50 secured within the side portion of body 15 and its upper leg 51 secured within roof 25. The torsion portion 52 extends horizontally relative to the bar 15a. The torsion bars are of such strength that they contribute to the raising of the roof but cannot do so unaided.

To ensure that roof 25 is secured in a closed position, toggle-type securing members 54 may be provided as spaced along the outer roofs, one such securing member shown in FIG. 6.

In converting an ordinary van vehicle into a camper unit in accordance with the invention, it has been found practical to manufacture roof 25 from a portion 57 cut from the top of the vehicle which is then provided with reenforcement ribs 55. The interior paneling 56 is secured to the metal top portion 57 via ribs 55 and the space between the paneling and top portion is filled with styrofoam 60. By this means of manufacture the roof 25 constitutes a relatively strong component with comparatively good insulation. Ceiling panel 20 is manufactured in a similar manner, with the same advantageous results being provided with a framework 64 and upper and lower plies 62 and 61, the interior being filled with styrofoam 65.

The components which comprise roof 25 and ceiling panel 20 are next attached to the hinges 46 and 45, respectively, which are connected to bars 15a rigidly included in the vehicle's body 15, leg 50 of each torsion bar 47 being secured within the side of the body 15 and leg 51 within roof 25. Tent rod 26 is attached through its supporting rods 36 to bar 15a as are struts 27, their hinges and axes being proximate and parallel to the axis of the hinge 45.

In practice, to provide the additional space afforded by the camper as seen in FIG. 1, the toggle securing members 54 are first unlatched and roof 25 is raised to its desired upright position with struts 27 extended as shown in FIG. 7. Then slideable member 34 is brought to the position shown in FIG. 7 over and beyond the dedent member 35 thereby locking the roof in its upright position. Ceiling panel 20 is next moved 180° about its hinge 45 which causes tent 16 to open and positions the straps 24 which, together with the tent, are carried between the ceiling panel and roof when in closed positions. Turnbuckles 37 are then adjusted as necessary and the poles 21 (which may be carried between the ceiling member and the roof with the tent and straps) are inserted and secured in recessed rings 22. However, as indicated previously, the actual support for the ceiling panel in the open position is provided by straps 24 together with tent 16.

The additional space and roominess of the camper achieved with the tent open as shown in FIG. 1 is remarkable and must be seen to be fully appreciated. Additionally, the space below the ceiling panel as seen in FIG. 1 is protected from the rain and may be utilized for numerous purposes which will occur to the experienced camper. If desired, this space may be surrounded by canvas or screening to provide a further space isolated from the outside elements.

As previously indicated, the van 15 may be oriented either to maximize the ventilation and cooling of the interior of the camper including the tent 16 or to minimize the same.

Although the preferred and currently contemplated best mode of carrying out the invention has been set forth in the foregoing description, it is to be understood that the invention is capable of other adaptations and modifications which fall within the ambit of the following claims.

Having thus described my invention, what I claim as new and desire to secure by Letters Patent of the United States is:

1. A camper unit which comprises a generally box-shaped body including a floor, sides, a ceiling panel at its top and a roof thereover, the vertical dimension between said floor and said ceiling being sufficient whereby a person of normal size may sit comfortably on a seat provided in said body, said roof being connected along one side of said body by a first hinge means and adapted to be turned to an open position about said first hinge means in an arc of movement of at least about 45° and not more than about 90°, said ceiling panel being further connected along another side of said body opposite said one side by a second hinge means and adapted to be turned to an open position about said second hinge means in an arc of movement substantially of about 180°, first supporting means interconnecting said roof and said body adapted to maintain said roof substantially rigid relative to said body in said open position, second supporting means which at least in part depends from said roof providing support for said ceiling panel to maintain same secured in its open position, and tent means mounted to extend from an edge of said roof away from said first hinge means to an edge of said ceiling panel away from said second hinge means, the top of said body being substantially entirely opened when said roof and said ceiling panel are in opened position whereby a person of normal size can stand on said floor comfortably with space between his head and said tent means thereover.

2. A camper unit in accordance with claim 1, wherein said second support means comprise connecting means from said roof to said ceiling panel.

3. A camper unit in accordance with claim 2, wherein a rod is provided spaced above said ceiling panel when it is in open position, rod supporting means maintaining said rod spaced above said ceiling panel, said tent being supported in part by said rod.

4. A camper unit in accordance with claim 3, wherein said second supporting means is connected to said rod supporting means.

5. A camper unit in accordance with claim 3, wherein said rod supporting means comprises at least one pair of further rods each pivotably connected in the region of said second hinge means.

6. A camper unit in accordance with claim 5, wherein said further rods include means for adjusting their length and thereby adjusting the level of said ceiling panel when opened.

7. A camper unit in accordance with claim 5, wherein said first supporting means comprises articulated means which is folded when said roof is closed and provides support for said roof when in its open position, said first supporting means being pivotably connected in the region of said further rods pivotable connection and said second hinge means.

8. A camper unit in accordance with claim 7, wherein said first supporting means and said further rods are carried in a space adjacent an end of said ceiling panel and under said roof when said ceiling panel and said roof are in closed positions.

9. A camper unit in accordance with claim 6, wherein said tent is carried in a folded condition between said ceiling panel and said roof when they are in closed positions.

10. A camper unit in accordance with claim 1, wherein said second supporting means comprises at least one strap connecting said roof and said ceiling panel in their aspects opposite their respective hinge means, said strap being carried in a folded condition between said ceiling panel and said roof when they are in their closed positions.

11. A camper unit in accordance with claim 1, wherein said arc of movement of said roof is between 45° and 90°.

12. A camper unit in accordance with claim 11, wherein said arc of movement of said roof is about 75°.

13. In a camper vehicle, a body for the vehicle including an interior ceiling panel on the top thereof and a roof above said ceiling panel whereby there is sufficient space in said body under said ceiling panel for a person of normal size to be seated with space between his head and said ceiling panel, said roof being hingedly connected to said body on one side and said ceiling panel being hingedly connected to said body on a side opposite said hinged connected for said roof, said roof being pivotable upwardly to an open position about its hinged connection through an arc of movement of at least 45° and not more than about 90° and said ceiling panel being pivotable to an open position about its said hinged connection through an arc of movement of at least about 180°, supporting means interconnected to said body for securing said roof and said ceiling panel from said roof in place relative to said body after their respective pivoted movement, and covering means connectable to both said roof and said ceiling panel for defining space above said vehicle which is coextensive with the space in said vehicle when said roof and said ceiling panel are in their open positions whereby there is sufficient space for a person of normal size to stand in said body.

14. A camper vehicle in accordance with claim 13, wherein torsion spring means is provided between said body and said roof whereby said roof is urged upwardly about its hinged connection relative to said body.

15. A camper unit adapted for the top of a passenger carrying vehicle, said camper unit comprising a pair of substantially rectangular horizontal superimposed panels having a width about equal to the width of said vehicle, each of said panels being hinged on its longer side and relative to a side of the vehicle whereby said panels are hinged along opposite longer sides of the top of the vehicle, one of said panels being adapted to be pivoted about its hinge to an upright position, the other of said panels adapted to be pivoted about its hinge 180°, support means extending from the upper end of said one panel to the outward end of said other panel supporting said other panel from said one panel after said pivoting thereof through said 180°, and covering means stowed between said panels adapted to be secured to said upper end of said one panel and to said outward end of said other panel, said one panel adapted to comprise the exterior roof of the vehicle and said other panel adapted to comprise the interior ceiling of the vehicle.

16. A camper vehicle which comprises, in combination, a van type body and a roof therefor disposed at the top thereof which is hingedly connected along one of the longer sides of the body, a panel, a second hinge means hingedly connecting said panel to the other longer side of the body to form the interior ceiling panel of the vehicle when in a closed position, covering means disposed between said roof and said ceiling panel when both are in a closed position, said covering means including connection means for connection to the unhinged longer sides of said roof and said ceiling panel, said roof adapted to be pivoted in a first direction in an arc of between about 45°–90° to an open position and said ceiling panel adapted to be pivoted about said hinge means in a direction opposite said first direction in an arc of about 180° to an open position whereby the top of said body is substantially open between both said hinge means and with said covering member connected to both unhinged longer sides of said roof and said panel, ample head room exists thereunder for persons of a normal height to stand, and means for securing said roof in said opened position, said ceiling panel being supported in opened position at least in part by means depending from the unhinged longer side of said roof.

17. A camper vehicle in accordance with claim 16, wherein said means for securing said roof includes means for supporting said roof in a substantially upright position.

18. A camper vehicle in accordance with claim 17, wherein said roof supporting means comprises struts which are pivotably connected to the same side of said body as said panel on one end, and are pivotably connected to said roof on the other end, said struts being articulated whereby they are folded when said roof is closed over said body.

19. A camper vehicle in accordance with claim 18 wherein said struts are hinged whereby one is to the rear of said panel and the other is forward of said panel.

20. A camper vehicle in accordance with claim 19, wherein said struts are each provided with a slideable member adapted to slide over the articulation of the unfolded strut and maintain said strut in an extended position.

* * * * *